Aug. 25, 1959 M. CANEPA 2,901,540

NON-RESETTING DECODING AND PRINTING APPARATUS

Filed Nov. 15, 1956 4 Sheets-Sheet 1

INVENTOR
MICHELE CANEPA

Kenyon & Kenyon
ATTORNEYS

NON-RESETTING DECODING AND PRINTING APPARATUS

Filed Nov. 15, 1956 4 Sheets-Sheet 2

INVENTOR
MICHELE CANEPA

Kenyon & Kenyon
ATTORNEYS

INVENTOR
MICHELE CANEPA
Kenyon & Kenyon
ATTORNEYS

Aug. 25, 1959 M. CANEPA 2,901,540

NON-RESETTING DECODING AND PRINTING APPARATUS

Filed Nov. 15, 1956 4 Sheets-Sheet 4

INVENTOR.
MICHELE CANEPA
BY
Kenyon & Kenyon
ATTORNEYS

United States Patent Office 2,901,540

Patented Aug. 25, 1959

2,901,540

NON-RESETTING DECODING AND PRINTING APPARATUS

Michele Canepa, South Norwalk, Conn., assignor to Olivetti Corporation of America, New York, N.Y., a corporation of Massachusetts Application November 15, 1956, Serial No. 622,377

12 Claims. (Cl. 178—34)

This invention relates to apparatus for decoding and printing binary coded decimal information, and more particularly to apparatus adapted for use in conjunction with a binary code counter or calculator to convert the results thereof to decimal notation and to print the latter on a suitable recording medium.

More specifically, this invention relates to apparatus of the above-mentioned type which does not require resetting of the printing mechanism to zero between decoding and printing of each successive decimal value.

In conventional calculating machines, numerical information in decimal form is fed into the machine wherein it is translated into the corresponding binary form for purposes of computation. After the mathematical operations have been performed on such information, the arithmetic result is consequently obtained in binary code group terms and it becomes necessary to convert the same back into the decimal digit notation in order to provide a readable result. The conversion is generally accomplished in standard calculators by means of a decoding circuit whose output is fed to a separate printing device.

In my copending patent application Serial No. 527,340, filed August 9, 1955, there is disclosed an improved decoding-printing apparatus employing a printing device which also performs the decoding. Briefly, it is comprised of an endless belt bearing decimal die members on its outer surface, disposed around a pair of axially spaced gear members. The belt is advanced by a stepping clutch mechanism in response to binary code groups received from the calculating machine output to successively present decimal dies on the belt at a printing station representative of successive of said binary code groups. After each binary group is thus decoded and the corresponding decimal digit printed, the belt must be reset to zero before the next such group is received for decoding. One such belt is required for each decimal digit represented by the decoding and printing apparatus.

It is an object of the present invention to provide an improved apparatus for decoding and printing binary coded decimal information.

It is another object of the present invention to provide an improved decoding and printing apparatus which does not require resetting of the printing mechanism between successively decoded decimal numbers.

It is an additional object of the present invention to provide such a decoding and printing apparatus in which the information fed into the printing mechanism is temporarily stored and then subsequently subtracted from the next succeeding information so that the printing mechanism only need be advanced by an amount equal to the arithmetic difference between successive numbers printed.

It is a further object of this invention to provide such a decoding and printing apparatus in which one subtraction means and one storage means can be used to supply a plurality of decoding and printing mechanisms.

Still other objects and features of this invention will appear in reading the following disclosure and drawings, and the appended claims.

In the present invention, information for any decimal digit is temporarily stored indicating the last setting of the printing mechanism and this is subtracted from the next information being fed into the printing mechanism so that instead of necessitating a resetting thereof to zero, the printing mechanism is advanced directly from the old setting to the next new setting. In this fashion the present invention eliminates the need for resetting and permits greatly accelerating the decoding and printing of calculating machine information. It is estimated that by thus eliminating resetting, the time required for a given cycle (i.e. the decoding of one binary code group) can be shortened by forty percent.

To accomplish the above results, the decoding and printing apparatus of my copending application as described above is employed without the resetting mechanism, in combination with magnetic shift register storage devices and a magnetic core trigger pair-coincidence subtraction circuit, the general arrangement thereof being shown in Fig. 1.

Electrical coded pulses are received from a source such as a calculating machine output and are delivered through an input means 10 simultaneously to the #1 shift register 11 storage means and the subtraction means or circuit 12. The #1 shift register 11 has a number of cores equal to four times the number of decimal digits being handled by the decoding and printing apparatus, as will be explained.

Binary coded groups are serially received from the calculating machine output in a consecutive fashion for the various decimal digits so that when any one incoming binary group is received corresponding to a particular digit and is delivered to the subtraction circuit 12, the corresponding preceding group which had been received for such digit will have just passed step-wise through the #1 shift register 11 and be delivered from the latter to the subtraction circuit 12 to be subtracted from said incoming group. The arithmetic difference between such groups is delivered in binary coded form through a distributing means (e.g. #2 shift register 13) to the corresponding decoding and printing device 14 for such digit. Since only difference signals are supplied to the printing device 14 between successive numbers, there is no need for resetting between such numbers. This will become more clearly understood from the fuller description given hereinafter.

*Magnetic cores*

Figure 2:
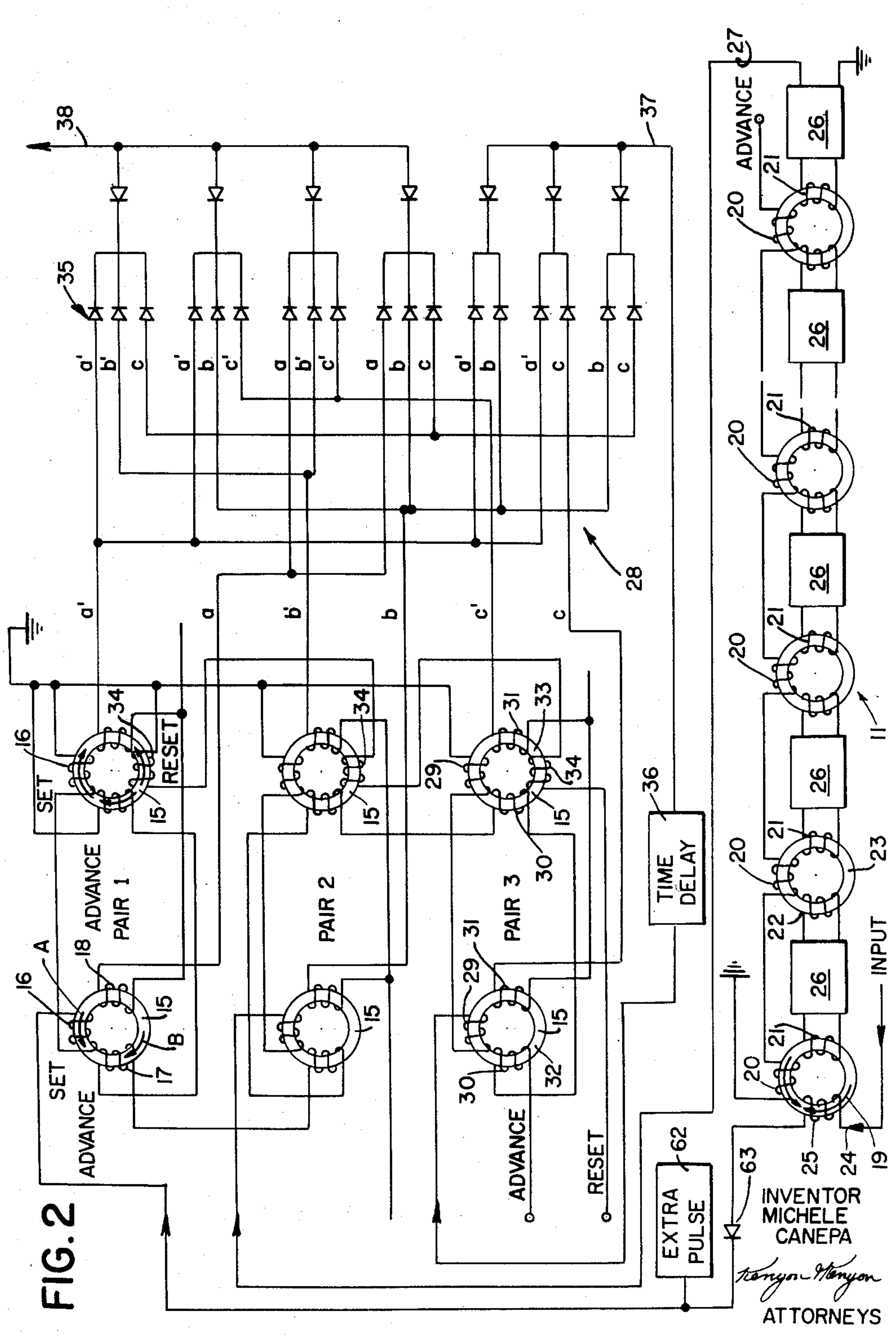
Fig. 2 is a schematic diagram of the magnetic shift register delay line and the subtraction circuit.
Figure 3:
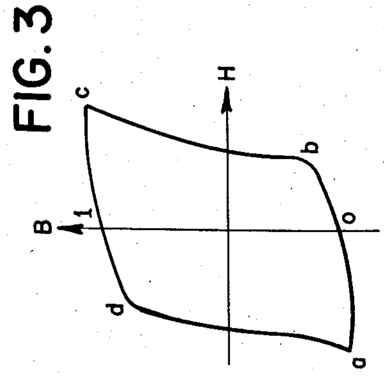
Fig. 3 is a graphical presentation of a hysteresis loop characteristic of the magnetic cores used herein.

The shift registers 11, 13 and the subtraction circuit 12 make use of ferromagnetic cores 15 which have approximately rectangular hysteresis loops (see Figs. 2 and 3). These cores, although of relatively recent origin, are now fairly well-known in the art.

A basic description of their properties and method of operation is given in "Static Magnetic Storage and Delay Line," An Wang and Way Dong Woo, 21 Journal of Applied Physics 49 (January 1950). A description of the use of such cores in a trigger pair is given in my copending application, Serial No. 476,023, filed December 17, 1954.

Binary bits in the form of "0" or "1" are stored in such a ferromagnetic core in the form of positive or negative residual magnetism, depending on the direction of the last magnetizing force applied. Binary bits "0" and "1" are represented by the points so labelled on the hysteresis loop for the core as shown in Fig. 3, the "1" condition being established by the application of a positive pulse of magnetizing force H, and the "0" condition by a negative pulse of magnetizing force H, the direction of evolution of the curve being *a*, *b*, *c*, *d*, *a*.

With a ring-shaped core having a "set" winding 16, an "advance" winding 17 and a "secondary" winding 18 such as is shown at the upper left in Fig. 2, then starting with the core in the "0" condition, the application of a positive pulse of magnetizing force H through the "set" winding 16 causes a flux in the core 15 as shown by the arrow A and stores a binary "1." When a negative pulse of magnetizing force H is thereafter applied to the "advance" winding 17, an opposite flux is set up in the core as shown by the arrow B, and the core is changed to the "0" condition.

The above change from the "1" to the "0" condition causes a high voltage to be induced in the "secondary" winding 18, whereas the application of the negative pulse to the "advance" winding 17 with the core in the "0" condition causes a very much lower induced secondary voltage. The ratio of these induced secondary voltages has been found to be as high as 30:1 for certain magnetic materials. The high induced voltage can be used to drive another such core from the "0" to the "1" condition, as will be explained in greater detail hereinbelow. A core will retain its residual magnetism representing either the "0" or "1" condition indefinitely until changed by the appropriate opposite magnetizing pulse to the other condition.

*Magnetic shift register*

The high voltage induced in the "secondary" winding of a core during the change from the "1" to the "0" condition is used in the magnetic shift register delay line circuit to convert the adjacent coupled core from the "0" to the "1" condition (see Fig. 2). By intercoupling a plurality of cores as shown, a storage unit can be constructed through which a series of binary bits can be propagated step-wise and then delivered therefrom after a predetermined time delay, as is now well-known in the art.

With the first core 19 of the delay line in the "1" condition, the passage of a —H advance pulse through the "advance" winding 20 converts that core from the "1" to the "0" condition, and simultaneously the high voltage induced in the "secondary" winding 21 passes to the intercoupled "set" winding 22 of the second core 23 and establishes the "1" condition therein.

If the first core 19 had originally been in the "0" condition, the advance pulse would have left that core in the latter condition, no large induced pulse would have passed through the "secondary" winding 21 to the next core 23, and consequently the second core 23 would be in the "0" condition thereafter at least until the next advance pulse.

In the above fashion it can be seen that a plurality of binary bits "0" or "1" introduced serially at the input 24 of the #1 magnetic shift register 11, namely either a positive pulse, representing a "1," or the absence of such a pulse, representing a "0," at the "set" winding 25 of the first core 19, are passed step-wise along the line of cores by the advance pulses applied simultaneously to the series connected "advance" windings 20 of all the cores after the introduction of each such bit to the input.

Figure 4:
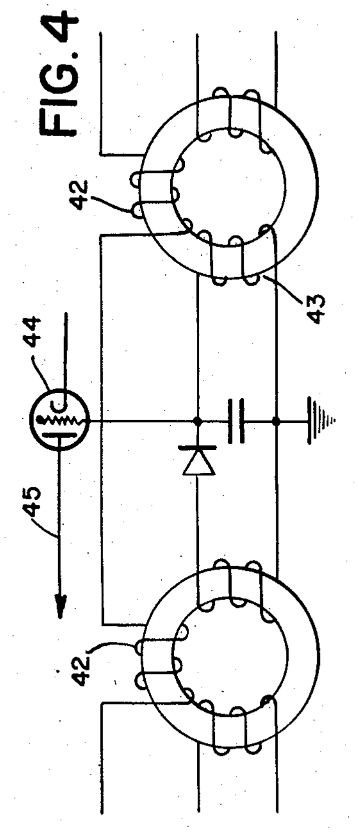
Fig. 4 is a schematic diagram of a portion of the switching circuit at the subtraction circuit output.

R-C networks 26 are interposed between each pair of adjacent cores to prevent the large induced secondary voltages created by the change from "0" to "1" from passing beyond the immediately adjacent core (see also Fig. 4).

Thus, in a decoding and printing apparatus for the presentation of four decimal digits, each derived from –1–, –2–, –4–, –8–, binary coded groups, a shift register of 4×4, or 16, series-coupled magnetic cores is required in order that the binary coded group for any one decimal digit will pass step-wise through the #1 shift register 11, and be delivered from the output 27 thereof to the subtraction circuit 12 simultaneously with the reception of the next succeeding binary coded group for such particular decimal digit at the subtraction circuit directly from the input 24, so that the former group can be subtracted from the latter group in a manner to be hereinafter described.

Thus the number of cores used in the shift register depends on the binary system being used and the number of different decimal digits being represented. In other words, where the binary system employs *n* different binary elements for each decimal digit, the number of cores required in the shift register would be *n* times the number of different decimal digits being represented.

*Subtraction circuit*

Fig. 2 shows the subtraction means or circuit 12, which is comprised of a coincidence circuit 28, and three trigger pairs: Pair 1, pair 2 and pair 3 respectively, as indicated, each having two intercoupled magnetic cores 15 exhibiting the properties as described above and each such trigger pair operating as described in my copending application Serial No. 476,023, filed December 17, 1956, to provide pulses representative of a binary digit and its complement.

Referring to pair 3 by way of example, each core 15 is provided with three windings: a "set" winding 29, an "advance" winding 30, and an output winding 31, respectively which function as previously described.

The "set" winding 29 of the first core 32, is connected in series to the set winding of the second core 33. Similarly, the "advance" winding 30 of the first core 32 is connected in series to the "advance" winding of the second core 33. The output windings 31 are connected together at one end, and at the other ends positively provide, respectively, indications of the presence of a signal *c* or its binary complement *c'*. In other words, a "1" or a "0," whichever the case may be.

In such trigger pair, the second core 33 is provided with a fourth winding called a "reset" winding 34. As an input pulse is applied to the "set" windings 29 of the trigger pair, the two cores will be driven to saturation (see also Fig. 5). Considering the first core 32 first, if now an advance pulse is applied through its "advance" winding 30, the first core 32 is returned to its original saturation, and the signal which may be called *c* appears at its output winding 31.

For the second core 33, prior to introduction of the input pulse, a "reset" pulse is applied to the fourth or "reset" winding 34 so that if the input pulse produces a magnetomotive force opposite to the one produced by the prior reset pulse, the second core 33 is in the original state of saturation, and the application of the advance pulse at this point will not produce a signal at its output winding 31.

When, on the other hand, no input pulse is applied, then at the introduction of an advance pulse no output signal is obtained from the first core 32, while, because of the prior introduction of a reset pulse through the "reset" winding 34, an output signal will appear at the output winding 31 of the second core 33, thus providing the complementary signal *c'*.

It will be noted that the "advance" windings of all cores in all three trigger pairs are connected in series. Likewise, the three "reset" windings 34 of the respective trigger pairs are connected in series, so that they may simultaneously receive the same pulses.

The trigger pair 1 outputs are designated $a$ and $a'$, trigger pair 2 outputs $b$ and $b'$, and trigger pair 3, $c$ and $c'$ respectively. Similar designations are indicated at the respective rectifiers 35 of the coincidence circuit 28 to show the parallel connections made thereto from said outputs.

The three trigger pairs supply the above mentioned complementary pulses to the rectifier means or coincidence circuit 28 which combines them in accordance with the well-known principles of Boolean algebra to deliver pulses to the decoding and printing apparatus 14 representative of the arithmetic difference: $D=a-b-c$.

The canonical form for the above expression is as follows:

| $a-b-c=D\ C_D$ | | | | |
|---|---|---|---|---|
| 0 | 0 | 0 | 0 | 0 |
| 0 | 0 | 1 | 1 | 1 |
| 0 | 1 | 0 | 1 | 1 |
| 0 | 1 | 1 | 0 | 1 |
| 1 | 0 | 0 | 1 | 0 |
| 1 | 0 | 1 | 0 | 0 |
| 1 | 1 | 0 | 0 | 0 |
| 1 | 1 | 1 | 1 | 1 |

Thus, for example, if $a=1$, $b=1$, and $c=0$, then D, the difference, equals 0 and the carry $C_D=0$.

As another example, if $a=0$, $b=1$, and $c=1$, then $D=0$ and $C_D=1$. The pulse from the coincidence circuit 28 representing the carry singal "1" is delivered through any standard type of time delay 36 to the "set" windings 29 of the third trigger pair or pair 3, coincident with the reception by the other trigger pairs (i.e. pair 1 and pair 2) of pulses for the next succeeding binary bits of the same binary code groups.

Pair 1 receives pulses from the input 24, i.e. pulses being received from the calculating machine output; pair 2 receives pulses from the output 27 of the #1 magnetic shift register 11; and pair 3 receives the carry pulses from the coincidence circuit 28 as aforementioned. Thus, for example, as pair 1 receives the binary –2– bit, if any, of the incoming signal from the calculator for the decimal units digit, pair 2 simultaneously receives the binary –2– bit, if any, from the output 27 of the #1 magnetic shift register 11 for the last preceding decimal units digit, and pair 3 receives the carry signal, if any, from the immediately preceding subtraction operation of the corresponding binary –1– bits of the same respective binary code groups being fed to pair 1 and pair 2.

Figure 5:
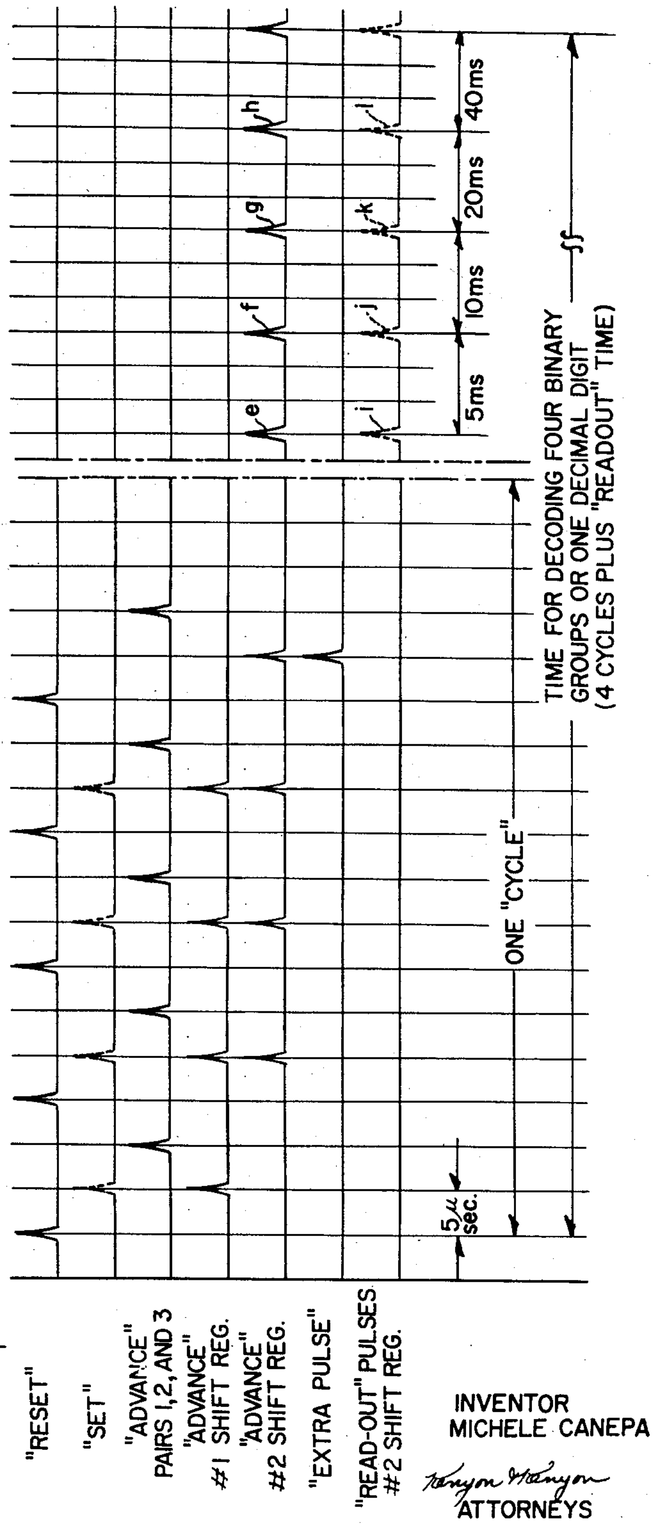
Fig. 5 shows the sequence of pulses applied to the various windings of the apparatus.

Fig. 5 shows the time relationship of the various pulses utilized in this invention. The "set" pulses are represented by dotted lines to show that the existence of any such pulse depends on the information being received from the calculating machine output. The extra pulse, also applied to the "set" windings 16 of pair 1, is shown in solid lines to show that it is regularly applied without contingency. The pulses shown to the left of the line break in Fig. 5 represent the time interval for handling one complete binary code group for any particular decimal digit, or "one cycle" as previously mentioned. The time intervals between any of the different pulses for one cycle are very short, e.g. five micro-seconds as shown by way of example.

All of the pulses utilized in the present apparatus can be provided by any well-known pulse generator.

The above bits and their respective complements are then fed into the coincidence circuit 28 which combines them in accordance with the Boolean algebraic expression:

$$D=a'b'c+a'b'c'+ab'c'+abc$$

to get the difference $a-b-c$. The carry signal is obtained according to: $C_D=a'b+a'c+bc$. These algebraic expressions are obvious in view of the aforementioned canonical form.

A pulse is thereby obtained at the output of the coincidence circuit 28, either at the carry output 37, or the difference output 38, whenever any of the required simultaneous combinations of pulses appears at one of the particular groups of rectifiers as indicated by the letters representing the respective trigger pair outputs.

The output signals representing D are fed from the difference output 38 of the coincidence circuit 28 to a distributing means so that such signals will be transmitted to the correct decimal digit decoding and printing apparatus. In the present embodiment of the invention as shown in Fig. 1, a #2 shift register 13 is employed for this purpose, having an identical number of cores as the #1 shift register 11 previously described.

The #2 shift register 13 serially receives the above output signals or binary bits representing the binary groups for all the digits of any particular decimal number representing the arithmetic difference by which the printing means is to be advanced. This information is received and advanced along the line in the usual fashion until the entire register is "loaded" with the information for all such digits. The core group 39 (representing four cores), farthest from the register input 40 stands, for example, with the information for the units digit decoding and printing apparatus; the next farthest core group 41 contains the tens digit information, and so on.

Figure 1:
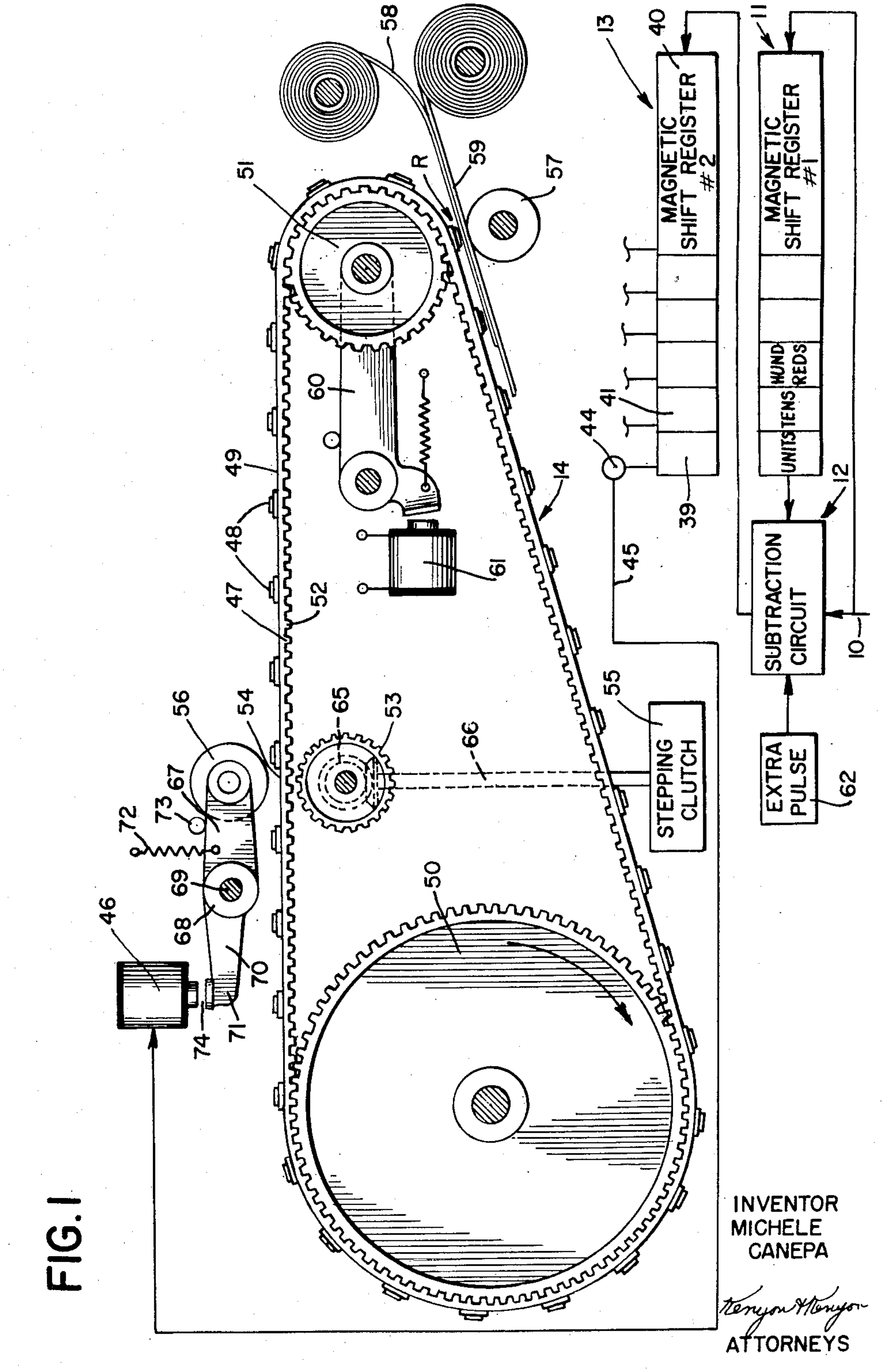
Fig. 1 is a partially sectionalized side elevation view of a single decoding and printing unit showing the other related circuit elements in block diagram form.

At this point, a series of four advance pulses $e$, $f$, $g$ and $h$ (see Fig. 5) are transmitted to the "advance" windings 42 of the #2 register to "clear" or "read out" the register, or in other words, to advance the information standing therein in the usual fashion four cores to the left as viewed in Fig. 1 (see also Fig. 4). The time intervals between these "advance" pulses $e$, $f$, $g$ and $h$ are, for example, 5, 10, 20 and 40 milliseconds respectively as shown, or in other words, of sufficient spacing to permit the stepping clutch of the decoding apparatus to respond to successive of such pulses so that the respective –1–, –2–, –4–, and –8– binary bits can be decoded in a manner to be described.

Connected to the output winding 43 of the last core (the core farthest to the left as viewed in Fig. 1) of each core group is a switching means 44, for example, a thyraton as shown in Fig. 4. Thus, as the information is cleared serially from the shift register in the above fashion, the "read out" pulses $i$, $j$, $k$ and $l$ from each core group (corresponding in time spacing to "advance" pulses $e$, $f$, $g$ and $h$ respectively) pass out through its particular thyratron and are transmitted through the plate conductor 45 thereof to the electromagnet 46 of the decoding and printing apparatus for the respective decimal digit. Thus the arithmetic D in binary form for each decimal digit is decoded and printed as described in my copending application Serial No. 527,340, filed August 9, 1955 referred to above, and as explained below.

*Decoding and printing apparatus*

The decoding and printing apparatus for each digit comprises generally an endless belt 47 bearing two series of sixteen evenly spaced decimal characters or dies 48 displaced along the outer surface 49 thereof, said belt being carried by a pair of idler gears 50, 51 which are mounted on respective shafts 50*a*, 51*a* and are engageable with the gear-tooth undersurface 52 of the belt as shown in Fig. 1.

Figure 6:
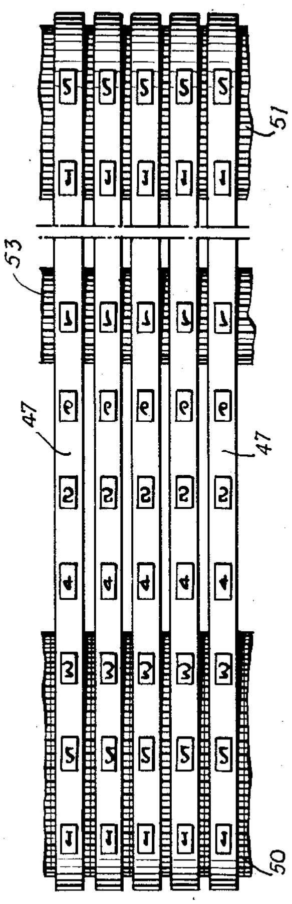
Fig. 6 is a reduced plan view of the belts of a plurality of decoding and printing units as assembled for synchronized operation.

Extending between the said gears 50, 51 is a driving gear 53 which is disposed adjacent but out of contact with an intermediate portion 54 of the belt on shaft 53*a*. The belts and associated idler gears for all digits are mounted parallel to one another as shown in Fig. 6 so that one axially elongated driving gear 53 can be used for the entire group of belts. The driving gear 53 is connected through gear 65 and drive shaft 66 to a stepping clutch mechanism 55 of the general type disclosed in association with the commutator control circuit of my copending application Serial No. 514,631, filed on June 10, 1955. Such a mechanism imparts four consecutive angular displacements of varying magnitude to the driving gear 53 which are representative of the elements of the binary code, that is to say one fraction of a revolution to represent a binary –1–, then twice that amount to represent a binary –2–, and so on until the driving gear has been rotated in successive steps to represent the entire 1–2–4–8 binary code group. The driving gear 53 is directly connected to the stepping clutch so that it is being continually rotated in such successive angular displacements during use of the device.

Disposed above each of said belts 47 and directly opposite to the driving gear 53 is a respective pressure roller 56 which is rotatably mounted on one arm 67 of a lever 68. The lever 68 is adapted for movement about a central pivot 69 and has an armature portion 70 on its other arm 71 associated with an electromagnet 46. In its normal position the pressure roller is held out of contact with the endless belt by a coil spring 72 which biases the associated lever arm 67 in a counterclockwise, or upward, direction against stop 73 as viewed in Fig. 1. This likewise holds the armature portion 70 downward and separated from the electromagnet 46 by a slight gap 74.

The electromagnet 46 for each belt assembly is connected through its respective thyratron 44 to the #2 shift register and is energized in response to the binary components of the particular number present in the associated core group of the #2 shift register at "read out" time. When the electromagnet is so actuated, the armature portion 70 is pulled upwardly against the electromagnet which causes lever arm 67 to be moved in a clockwise direction against the spring bias, and consequently the pressure roller 56 moves downwardly as viewed in Fig. 1 against the belt 54 pushing the latter into operative meshing engagement with the driving gear 53. While the electromagnet remains so energized, the driving gear 53 moves the belt along to the right in a series of successive longitudinal displacements in response to the stepping clutch as described.

The aforesaid die members 48 are disposed along each endless belt 47 at distances from one another equivalent to a binary –1–, i.e., the distance the belt is moved by the driving gear to represent a binary –1–. Each belt as shown in Figs. 1 and 6 possesses, for example, two series of 16 die members or 32 in all, respresentative of twice the number of permutations of the four binary digits. Ten characters of each series can be used to represent the ten decimal digits one through zero and the remainder can be operating signs such as +, — or the like.

A point opposite idler gear 51 is taken as a reference point R.

Such reference point is relatively the same for each belt assembly and a platen 57 is provided thereat which extends across the entire assembly bearing an inking ribbon 58 and a paper 59 between the ribbon and the platen. Each gear 51 adjacent the reference point R is mounted on one end of a respective pivot arm 60 so as to be selectively actuatable by a related electromagnet 61 to move downward against the platen and imprint the said particular belt character on the paper or recording medium 59. Since the decoding for all the decimal digits is simultaneous, the printing operation can be carried out simultaneously, and all electromagnets 61 are thus actuated at the same instant to print the multi-digit decimal number on the paper 59.

It is necessary that only the pulses delivered from the #2 shift register 13 to the decoding apparatus electromagnets 46 during the receipt of the four advance pulses to clear the register as described above, be effective in causing the respective belts 47 to be advanced. That is to say, the pulses from the #2 shift register during the time it is being "loaded" should not have any effect on the decoding and printing apparatus. Safeguards can be provided in any convenient manner. For example, the stepping clutch 55 may only be actuated during the appropriate intervals when the #2 shift register is being "cleared" or "read out." Thus, actuation of an electromagnet 46 at any other time would not cause the belt 47 to be advanced. Or switching means may be provided to connect the electromagnets 46 to the #2 shift register only during "read out" time.

In order to insure that the minuend during the subtraction operation will always be greater than the subtrahend, an additional binary bit is added by an appropriate pulse means 62 (see Figs. 2 and 5) to each code group being received by the "set" windings 16 of pair 1, and after every fourth "advance" pulse being fed to the #1 magnetic shift register 11, one such pulse is skipped. The skipped "advance" pulse is synchronized to occur at the time the above mentioned additional binary bit is being fed to pair 1. A rectifier means 63 is placed in the line between the pulse means 62 and the input 24 of the #1 shift register to insure that the extra pulse will not affect the condition of such shift register.

The above arrangement is to provide for the situation where, for example, the last units number decoded and printed was a decimal 9, and and the next number to be decoded and printed is a decimal 2. Without resetting it is desired to advance the printing belt nine dies to 2. The binary subtraction is performed as follows:

```
 1 0 0 1 0
 −1 0 0 1
 ---------
   1 0 0 1
```

That represented decimally is $(16+2)-9=9$. The belt is thus advanced nine steps to the next "2" (the belt having two series of sixteen dies each, or dies from 1 through 9 and 0, then six additional dies with any desired symbols, thereon, then the next series of 1 through 9, and so on. That puts the 9 of one series nine steps behind the 2 of the next series on the belt).

The additional binary bit in the case of a –1–, –2–, –4–, –8– binary code group would, of course, be a –16– bit, as shown above, and the pulse representing such bit is transmitted at the appropriate time to the "set" windings of pair 1 to conform to the above operation.

In this fashion the necessity for resetting the printing belt 47 between successively decoded numbers is obviated, with the concomitant advantages hereinbefore noted.

While one embodiment of this invention has been herein described, it is to be understood that certain changes may be made by those skilled in the art. For example this invention can be used with letters of the alphabet or other types of characters rather than Arabic numbers as described. It is to be understood, however, that such changes as well as others can be made without departing from the spirit and scope of this invention.

I claim:

1. An apparatus for decoding and printing binary coded information representing a plurality of decimal digits comprising subtraction means for serially subtracting successive binary coded decimal quantities for each of said digits and obtaining the respective arithmetic differences therebetween, input means directly coupled with said subtraction means for receiving such quantities and delivering them to said subtraction means, storage means interconnected between said input means and said subtraction means for serially receiving binary coded decimal quantities each representative of a particular one of said digits and for delivering said quantities after a predetermined time delay to said subtraction means along a parallel path, separate decoding means for each of said digits connected to the output of said subtraction means for converting each of said differences to a decimal notation, distributing means interconnecting said subtraction means and said decoding means for serially receiving said differences and for subsequently delivering the same to their respective decoding means simultaneously and printing means associated with said decoding means for imprinting said notation on a printing medium.

2. In the apparatus of claim 1, said distributing means comprising a magnetic shift register having an input connected to said subtraction means, a plurality of series connected magnetic cores corresponding to a preselected multiple *n* of said plurality of decimal digits, a separate switching means connected between every *n*th core, starting with the core farthest in the series from said input, and a different one of said decoding means.

3. In the apparatus of claim 1, said storage device comprising a magnetic shift register delay line having an input connected to said input means, an output connected to said subtraction means, and a number of interconnected magnetic cores corresponding to the number of decimal digits capable of being decoded and printed by said apparatus.

4. Apparatus for decoding and printing binary coded decimal information presented in bit form comprising a storage device, input means coupled therewith to supply said information serially to said device, subtraction means interconnecting both of the latter means for subtracting each stored bit from a succeeding bit to produce a binary coded value representing the difference therebetween, means connected with the output of said subtraction means to decode such binary coded values to produce corresponding decimal values, and means associated with said decoding means for printing the latter said values on a printing medium.

5. Apparatus for decoding and printing binary coded decimal information presented in bit form comprising a storage means coupled therewith, input means to supply said information serially to said storage means, subtraction means interconnecting both of the latter means for subtracting each stored bit from a succeeding bit to produce a binary coded value representing the difference therebetween, a plurality of decoding means connected with the output of said subtraction means each for decoding such differences for a particular decimal digit to produce corresponding decimal values, distributing means interconnected with said subtraction means and said decoding means for transmitting each difference from said subtraction means to the respective decoding means, and printing means associated with said decoding means for imprinting said values on a printing medium.

6. In the apparatus of claim 3, said distributing means comprising a magnetic shift register having a plurality of series connected cores of sufficient number to store all bits representing all the different decimal digits, a plurality of switching means each connected between one of said decoding means and a different one of said cores, said shift register operable to simultaneously deliver the bits for the different digits in a serial fashion through the respective switching means to the intercoupled decoding means.

7. In the apparatus of claim 1, said subtraction means comprising three pairs of magnetic cores, each of said cores having an approximately rectangular hysteresis loop and each pair of cores having an input and an output, the cores of each pair being electrically interconnected to reproduce received binary code bits and their binary complements, rectifier means being electrically interconnected to the outputs of said pairs to receive such bits and complements and produce difference signals and carry signals related thereto, the input of one of said pairs being connected to said input means, the input of another of said pairs being connected to said storage means, and the input of the third of said pairs being connected to said rectifier means to receive said carry signals, time delay means interposed between said rectifier means and the latter said input to delay the transmission of each of said carry signals a predetermined period of time.

8. Apparatus for decoding and printing binary coded decimal information presented in bit form comprising a storage device, input means coupled therewith to supply said information serially to said device, subtraction means interconnected with said input means and said device for subtracting each stored bit from a succeeding bit to produce binary coded values representing the difference therebetween, means connected with the output of said subtraction means to decode said binary coded values to produce corresponding decoded decimal values, and means associated with said decoding means for printing the said decimal values on a printing medium without resetting of the latter means between the production of successive decoded decimal values.

9. Apparatus for decoding and printing binary coded decimal information presented in bit form comprising a magnetic shift register delay line having an input, an output, and a number of interconnected magnetic cores corresponding to a preselected multiple of a predetermined number of decimal digits; input means coupled with said line to supply said information serially to said line; three pairs of magnetic cores, each of said cores having an approximately rectangular hysteresis loop and each of said pairs having an input and an output, the cores of each pair being electrically interconnected to reproduce at its output a binary code bit received at its input, as well as the binary complement of the same, rectifier means being electrically interconnected to the outputs of said pairs to receive such bits and complements at its input and produce at its difference output binary coded difference signals, and at its carry output carry signals therefor, the input of one of said pairs being connected to said input means, the input of another of said pairs being connected to the output of said delay line, and the input of the third of said pairs being connected to said carry output, and time delay means interposed between said carry output and the latter said input to delay the transmission of each of said carry signals a predetermined period of time; a plurality of decoding means corresponding to said predetermined number of decimal digits, each latter said means for decoding binary coded bits to produce a corresponding decimal value for a different one of said digits; distributing means interconnected with said difference output and said decoding means for transmitting the said difference signals to their respective decoding means; and a plurality of printing means on said decoding means each for printing the decoded decimal values for a particular one of said decoding means without resetting between the production of successive decimal values.

10. Apparatus for decoding and printing binary coded decimal information presented in bit form comprising a first magnetic shift register delay line having an input, an output, and a number of interconnected magnetic cores corresponding to *n* times a predetermined number of decimal digits; input means coupled with said line to supply said information serially to said line; three pairs of magnetic cores, each of said cores having an approximately rectangular hysteresis loop and each of said pairs having an input and an output, the cores of each pair being electrically interconnected to reproduce at its output a binary code bit received at its input, as well as the binary complement of the same, rectifier means being electrically interconnected to the outputs of said pairs to receive such bits and complements at its input and produce at its differenec output binary coded difference signals, and at its carry output carry signals therefor, the input of one of said pairs being connected to said input means, the input of another of said pairs being connected to the output of said delay line, and the input of the third of said pairs being connected to said carry output, and time delay means interposed between said carry output and the latter said input to delay the transmission of each of said carry signals a predetermined period of time; a plurality of decoding means corresponding to said predetermined number of decimal digits, each latter said means for decoding binary coded bits to produce a corresponding decimal value for a different one of said digits; a second magnetic shift register comprised of a number of series connected magnetic cores equal to the number of magnetic cores in said first magnetic shift register, each of said cores having an input winding, an output winding and an advance winding, the input winding of the first of such latter cores being connected to said difference output, a switching means connected to the output winding of the last of such latter cores, and a separate switching means similarly connected to every $n$th core starting with said last core, each switching means also connected to a corresponding one of said decoding means.

11. An apparatus for decoding and printing binary coded decimal information comprising subtraction means for subtracting binary coded decimal quantities from one another and obtaining the arithmetic difference therebetween, input means directly coupled with said subtraction means for receiving such quantities and delivering them to said subtraction means, storage means interconnected between said input means and said subtraction means for delivering said quantities after a predetermined time delay to said subtraction means along a parallel path, decoding means connected to the output of said subtraction means for converting said difference to a decimal notation, and printing means associated with said decoding means for imprinting said notation on a printing medium.

12. Apparatus for decoding and printing binary coded decimal information presented in bit form comprising a first magnetic shift register delay line having an input, an output, and a number of interconnected magnetic cores corresponding to $n$ times a predetermined number of decimal digits; input means coupled with said line to supply said information serially to said line; three pairs of magnetic cores, each of said cores having an approximately rectangular hysteresis loop and each of said pairs having an input and an output, the cores of each pair being electrically interconnected to reproduce at its output a binary code bit received at its input, as well as the binary complement of the same, rectifier means being electrically interconnected to the outputs of said pairs to receive such bits and complements at its input and produce at its difference output binary coded difference signals, and at its carry output carry signals therefor, the input of one of said pairs being connected to said input means, the input of another of said pairs being connected to the output of said delay line, and the input of the third of said pairs being connected to said carry output, and time delay means interposed between said carry output and the latter said input to delay the transmission of each of said carry signals a predetermined period of time; a plurality of decoding means corresponding to said predetermined number of decimal digits, each latter said means for decoding binary coded bits to produce a corresponding decimal value for a different one of said digits; a second magnetic shift register comprised of a number of series connected magnetic cores equal to the number of magnetic cores in said first magnetic shift register, each of said cores having an input winding, an output winding and an advance winding, the input winding of the first of such latter cores being connected to said difference output, a switching means connected to the output winding of the last of such latter cores, and a separate switching means similarly connected to every $n$th core starting with said last core, each switching means also connected to a corresponding one of said decoding means, and a plurality of printing means connected to said decoding means each for printing the decoded decimal values for a particular one of said decoding means without resetting between the production of successive decimal values.

References Cited in the file of this patent

UNITED STATES PATENTS

| | | |
|---|---|---|
| 2,564,403 | May | Aug. 14, 1951 |
| 2,609,143 | Stibitz | Sept. 2, 1952 |
| 2,736,017 | Marlowe et al. | Feb. 21, 1956 |
| 2,761,621 | Wright et al. | Sept. 4, 1956 |
| 2,771,599 | Nolde et al. | Nov. 20, 1956 |
| 2,781,968 | Chenus | Feb. 19, 1957 |
| 2,785,854 | Chaimowicz | Mar. 19, 1957 |
| 2,819,018 | Yetter | Jan. 7, 1958 |

UNITED STATES PATENT OFFICE

CERTIFICATE OF CORRECTION

Patent No. 2,901,540 August 25, 1959

Michele Canepa

It is hereby certified that error appears in the printed specification of the above numbered patent requiring correction and that the said Letters Patent should read as corrected below.

Column 9, line 34, strike out "coupled therewith" same line 34, after "input means" insert -- coupled therewith --; column 10, line 65, for "differenec" read -- difference --.

Signed and sealed this 23rd day of February 1960.

(SEAL)

Attest:

KARL H. AXLINE

Attesting Officer

ROBERT C. WATSON

Commissioner of Patents